United States Patent
Liedtke et al.

(10) Patent No.: US 11,454,790 B2
(45) Date of Patent: Sep. 27, 2022

(54) MICROSCOPE SYSTEM AND METHOD FOR OPERATING A MICROSCOPE SYSTEM

(71) Applicant: Carl Zeiss Microscopy GmbH, Jena (DE)

(72) Inventors: Mirko Liedtke, Jena (DE); Andreas Kühm, Dornburg-Camburg (DE); Burkhard Roscher, Jena (DE); Nico Presser, Jena (DE); Christian Kämmer, Saalfeld (DE)

(73) Assignee: Carl Zeiss Microscopy GmbH, Jena (DE)

( * ) Notice: Subject to any disclaimer, the term of this patent is extended or adjusted under 35 U.S.C. 154(b) by 360 days.

(21) Appl. No.: 16/610,037

(22) PCT Filed: Apr. 30, 2018

(86) PCT No.: PCT/EP2018/061008
§ 371 (c)(1),
(2) Date: Oct. 31, 2019

(87) PCT Pub. No.: WO2018/202607
PCT Pub. Date: Nov. 8, 2018

(65) Prior Publication Data
US 2020/0201010 A1 Jun. 25, 2020

(30) Foreign Application Priority Data
May 3, 2017 (DE) .......................... 102017109456.3

(51) Int. Cl.
*G02B 21/36* (2006.01)
*G06F 1/10* (2006.01)
*G02B 21/00* (2006.01)

(52) U.S. Cl.
CPC ......... *G02B 21/002* (2013.01); *G02B 21/365* (2013.01); *G06F 1/10* (2013.01)

(58) Field of Classification Search
CPC .. G02B 21/002; G02B 21/365; G02B 21/008; G02B 2207/114; G06F 1/10; G06F 1/12; G06F 13/38; G06F 13/385; G06F 13/4018
See application file for complete search history.

(56) References Cited

U.S. PATENT DOCUMENTS

| 5,706,484 A | 1/1998 | Mozdzen et al. |
| 6,563,358 B1 | 5/2003 | Goulette |

(Continued)

FOREIGN PATENT DOCUMENTS

| CN | 1833212 A | 9/2006 |
| CN | 102226852 A | 10/2011 |

(Continued)

OTHER PUBLICATIONS

Chinese Office Action dated Jun. 2, 2021 for 201880028869.3 with translation.

(Continued)

*Primary Examiner* — Mustak Choudhury
(74) *Attorney, Agent, or Firm* — Duane Morris LLP (57) ABSTRACT

A microscope system having a plurality of microscope modules connected to one another for data transfer purposes. The microscope system includes a central clock generator, the clock signal of which is provided to all microscope modules. The microscope modules are configured to use the clock signal or a clock derived therefrom as an internal clock. Moreover, a corresponding method for operating such a microscope system is described.

14 Claims, 2 Drawing Sheets

(56) References Cited

U.S. PATENT DOCUMENTS

| | | |
|---|---|---|
| 2003/0086145 A1 | 5/2003 | DeSimone |
| 2005/0062512 A1 | 3/2005 | Kato |
| 2007/0174524 A1* | 7/2007 | Kato ............... G06F 13/4018 710/71 |
| 2012/0188359 A1 | 7/2012 | Karube |
| 2015/0241681 A1* | 8/2015 | Hara ............... G02B 21/0084 359/201.2 |
| 2016/0179129 A1* | 6/2016 | Kim ............... G06F 1/12 327/144 |

FOREIGN PATENT DOCUMENTS

| | | |
|---|---|---|
| CN | 103080820 A | 5/2013 |
| CN | 103190889 A | 7/2013 |
| CN | 103427792 A | 12/2013 |
| CN | 103529903 A | 1/2014 |
| CN | 103616760 A | 3/2014 |
| CN | 104515469 A | 4/2015 |
| EP | 1681589 A1 | 7/2006 |
| EP | 1749231 A1 | 2/2007 |
| EP | 2360506 A1 | 8/2011 |
| EP | 2665184 A1 | 11/2013 |
| EP | 2665184 B1 | 9/2015 |
| WO | 2001050231 A2 | 7/2001 |
| WO | 0215561 A1 | 2/2002 |
| WO | 2006023427 A2 | 3/2006 |

OTHER PUBLICATIONS

Stepanov, Sergei, et al.; "Widefield TSCSPC-Systems with Large-Area-Detectors; Application in Simultaneous Multi-Channel-FLIM"; Proceedings in SPIE 2610; 7376:1-20.
Chinese Office Action dated Nov. 4, 2021 for 201880028869.3 with translation.
International Search Report with English Translation dated Aug. 27, 2018.
German Search Report dated Dec. 13, 2017.
Chinese Notice of Allowance dated Feb. 21, 2022 for 201880028869.3 with translation.

* cited by examiner

Fig. 1

PRIOR ART

MICROSCOPE SYSTEM AND METHOD FOR OPERATING A MICROSCOPE SYSTEM

RELATED APPLICATIONS

The present application is a U.S. National Stage application of International PCT Application No. PCT/EP2018/061008 filed on Apr. 30, 2018, which claims priority benefit of German Application No. DE 10 2017 109 456.3 filed on May 3, 2017, the contents of each are incorporated by reference in their entirety.

FIELD OF THE INVENTION

The present invention relates in a first aspect to a microscope system.

In a second aspect, the invention relates to a method for operating a microscope system.

BACKGROUND OF THE INVENTION

A generic microscope system has a plurality of microscope modules that are connected to one another for data transfer purposes.

Correspondingly, in the case of a method for operating a microscope system, it is provided that the microscope system has a plurality of microscope modules that transfer data among one another.

Microscope systems, for example laser scanning microscopes, are distributed systems that have a plurality of modules (referred to as microscope modules below). Great demands are placed on the data transfer between the modules. In particular, a bandwidth of the transfer should be as high as possible, the transfer quality should be as good as possible and a latency of the transfer should be as low as possible.

The ever-increasing demands on the transfer rate and temporal accuracy cannot be met in satisfactory fashion by known microscope systems, particularly if the employed pixel clocks are particularly short.

The individual modules usually have a dedicated clock generator. The latter operates independently of the clock generators of other modules. As a rule, a synchronization signal is used for communication between the modules. Should the modules receive the synchronization signal, this time is labeled and can be used for a synchronous procedure: By way of example, a module can transmit data as soon as it receives a synchronization signal. However, the arrival of a synchronization signal cannot be sensibly predicted by a module. Therefore, the module must prepare data to be transmitted and thereupon wait for a synchronization signal to be received. Relatively long unused time periods arise as a result.

Figure 1:
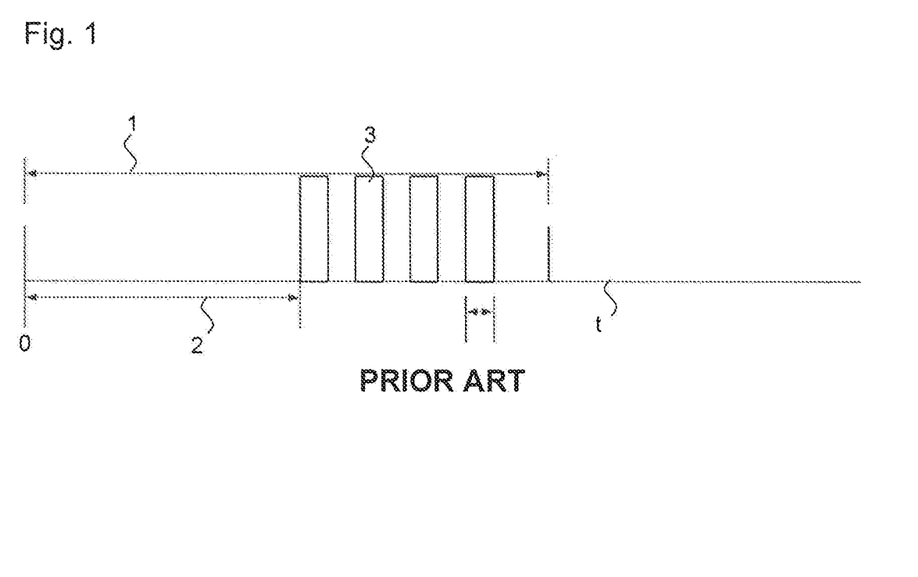
FIG. 1 is a schematic illustration of a delay-afflicted data transfer between modules of a microscope of the prior art.

These problems of the prior art are explained in more detail with reference to FIG. 1. FIG. 1 plots the duration 1, which labels a pixel length 1, along the horizontal time axis t. The pixel length 1 may represent a duration within which the microscope system should record a sample point (a pixel). To this end, scanning mirrors must be set on the sample point in the case of a scanning microscope. To this end, the actuation signals must be transferred to the scanning mirror within the pixel length. A start time 0, at which the pixel length starts, can be predetermined by a synchronization signal. Ideally, the appropriate microscope modules should generate the actuation signals for the scanning mirrors, and forward said signals to the latter, from this time. However, transfer delays and calculation durations, which cause a delay 2, arise in the process. Only the part of the pixel length 1 remaining after the delay 2 can be used for the signals 3. The pixel length 1 should be as short as possible in order to generate frame recordings that are as fast as possible. However, very short pixel lengths 1 have not been possible previously as a result of the delay 2.

By way of example, a conventional microscope system is described in DE 10 2011 055 639 B4. Here, a synchronizer is used, the latter synchronizing the data of the various modules as presented in paragraph [0087] of this document, in particular.

As a rule, standard interfaces for data transfer are only used in entry-level models in the case of microscopes. However, even conventional systems specifically developed for certain applications cannot meet the ever-increasing requirements. A latency between a transmitted datum and a synchronizing clock is particularly problematic since a simultaneous effect or an effect at a certain time cannot be ensured.

SUMMARY OF THE INVENTION

An object of the invention is to provide a microscope system and a method for operating a microscope system, which, in respect of the data transfer between components of the microscope system, facilitate the highest possible quality and high transfer rates.

This object is achieved by a microscope system having the features of, and by means of the method having the features, as set forth in the annexed claims.

Advantageous variants of the microscope system according to the invention and of the method according to the invention are subjects of the dependent claims and will additionally be explained in the description that follows.

In the microscope system of the aforementioned type, a central clock generator is present, the clock signal of which is provided to all microscope modules. The microscope modules are configured to use this clock signal or a clock derived therefrom as an internal clock.

According to the invention, in the aforementioned method, a central clock generator transmits a clock signal to all microscope modules. Thereupon, the microscope modules use the clock signal or a clock derived therefrom as an internal clock.

Consequently, all microscope modules can advantageously be synchronous down to a single oscillation period. Consequently, high data transfers at a good signal quality become possible.

The microscope modules can be configured to calculate data on the basis of the internal clock and transfer calculated data to another one of the microscope modules on the basis of the clock signal. Accordingly, data communication between the modules is implemented on the basis of a common clock, which is distributed to these modules. A microscope module has electronic components that carry out calculations or data processing on the basis of a clock (in particular on the basis of the internal clock of the respective microscope module). Here, data are output, some of which being intended to be transferred to other microscope modules, with this data transfer being implemented with the common clock signal that is supplied to all microscope modules or with a clock derived therefrom.

In addition to electronic components, each microscope module also includes optical elements that differ according to the module. By way of example, the optical elements in a laser scanning module or scanner module may have scanning mirrors, which are moved by way of galvanometers in particular. The electronic components of the scanner module can process information, for example continuously, about current scanning mirror positions; in particular, movement data can be captured, processed and output to another microscope module with each oscillation of the scanning mirrors. Accordingly, the scanner module does not simply output a frequency with which the scanning mirrors are actuated but outputs more precise data about the oscillation profile and, moreover, continually updated data as successive oscillations of scanning mirrors are not, as a rule, exactly uniform. By way of example, these position data can be transferred continuously to an image recording module by the scanner module during a measurement operation. The image recording module may include, e.g., one or more light detectors or camera(s) with associated lenses or other elements as optical elements. As electronic components, the image recording module may include, inter alia, an analog-to-digital converter for converting recorded image data into digital data and a computing unit for processing the digital data.

Scanning mirrors deflect an illumination light beam in a loop-like movement, with a speed of the scanning movement being reduced in the loop region and being greater along a straight line. In known methods, this threatens to cause distortions in the recorded image since analog-to-digital converters of an image recording module, as a rule, have to work at a fixed sampling frequency. Therefore, only the linear region (the straight line) of the scanning movement is typically used, while no image recording is implemented, or recorded image data remain unconsidered, in the loop regions. By way of example, in US 20150241681 A1, the illumination is only activated, and image data are only recorded, along the straight line of the scanning movement. By contrast, as a result of the data transfer according to the invention, continuously updated position data with respect to the scanning mirror movement can be detected and transferred to the image recording module, as a result of which a substantially greater component of the overall loop-like movement can be used for image recording purposes. In order to avoid image distortions, the image recording module for example uses the position data obtained as follows: the A/D-converter converts recorded image information items into digital data at a sampling frequency (in particular at a high and constant sampling frequency). Subsequently, the computing unit of the image recording module combines digital data from a variable number of sampling points of the A/D converter. The variable number is continuously updated and modified during the scanning operation on the basis of the received position data from the scanner module. As a result of this, image distortions are avoided. Such image processing only becomes possible by a synchronization and a transfer of relatively large amounts of data, for the purposes of which a common clock signal is used and continuously updated movement data are transferred during the scanning process.

A further example of an advantageous data transfer between microscope modules on the basis of the common clock signal is described below with reference to an image recording module and a light source module or laser module. The luminous intensity can be increased in a laser controller, wherein an actuation should be as linear as possible; i.e., the luminous intensity should increase as uniformly as possible when an actuation signal is increased. However, the laser brightness typically does not have a uniform profile here, which is why it may be advantageous to carry out a calibration of the laser actuation. Here, a luminous brightness is measured by the image recording module while the laser actuation increases the laser intensity. The data thus obtained are used to adapt the laser actuation. For a laser calibration (an automatic laser calibration, in particular), provision can be made for the image recording module to transfer recorded data (e.g., brightness data) to the laser module already during the calibration measurements and for the laser module to have a closed-loop control circuit that uses the received data to adapt the currently output laser intensity. This produces a control loop, by means of which a laser intensity is set to a desired value/target value. Thereupon, further illumination brightnesses can be set by means of the control loop for calibration purposes. So that such closed-loop control can be implemented within a short period of time, it is important, once again, for data transfer between the modules to be implemented on the basis of a common clock. More generally, this calibration can be implemented for any light source modules, which need not necessarily be designed as laser modules.

Advantages of the invention will be described below in comparison with FIG. 1. In the case of a conventional transfer according to FIG. 1, a synchronization signal has to be awaited, the latter arriving at a time that is not known to a microscope module. Transfers and possible calculations can only be undertaken after this time, resulting in a delay that cannot be used for the actual data transfer, such as the data for the scanning mirror actuation that must arrive within the pixel length 1 in the example of FIG. 1. The delay from FIG. 1 is furthermore afflicted by a disruptive jitter (i.e. a fluctuation). Unused delays can be avoided in the invention by using the common clock for all microscope modules: As a result of this, it is possible to predict times lying in the future and procedures can be carried out fittingly therewith. Thus, calculation durations and transfer delays can be taken into account, and so a microscope module transmits the actuation data for the scanning mirrors, for example, sufficiently timely such that these arrive at the module of the scanning mirrors at the start of the pixel length 1 and not only after the delay 2. Consequently, the central clock generator of the invention allows a faster and more efficient communication between the microscope modules.

A plurality of microscope modules can be disposed in succession on a bus. In particular, not every microscope module is directly supplied with the clock signal by the central clock generator in said case. Rather, the clock signal is forwarded from one microscope module to the next. At least some of the microscope modules may have a clock input circuit and a clock output circuit for the purposes of forwarding the clock signal. The clock signal is receivable by way of the clock input circuit and the clock signal can be output, more particularly in processed form, to another one of the microscope modules by way of the clock output circuit. To this end, the clock input circuit can be configured to condition the received clock signal and only then output the latter by way of the clock output circuit. By way of example, amplifiers and/or filters can be used for conditioning purposes.

Alternatively, it may however also be advantageous for a clock signal to be passed without such preparation. As a result, a processing time of the clock signal is reduced. Output coupling to the microscope modules can be implemented by way of a directional coupler or a power splitter in each case. In this embodiment, a line termination can be provided at a last module; therefore, a directional coupler is only optionally present in a last microscope module.

Accordingly, provision can be made for at least some of the microscope modules to each have a coupling circuit, more particularly a directional coupler, in order to couple a signal component of the clock signal into the respective microscope module. Thereupon, the coupled-in signal component can be amplified and, as described in respect of the remaining embodiments, evaluated in respect of its carrier frequency or encoded data and used for an internal clock. A remaining component of the clock signal, which is not coupled into the microscope module by way of the directional coupler, is guided to the remaining microscope modules without having to pass through the microscope module. A directional coupler is passively passed through by the clock signal, as a result of which line delays are particularly low. By virtue of an amplifier of a microscope module, too, being used only for internal use in the module and not for forwarding to other modules, delays in the line of the clock signal are particularly low.

The clock input circuit or another circuit of a microscope module can expediently be configured to extract a carrier frequency of the clock signal, in particular by way of a phase-locked loop (PLL). By way of example, the carrier frequency can be ascertained only by way of the rising pulse edges or falling pulse edges of the clock signal.

The feature of a microscope module using the clock signal as an internal clock can be understood to the effect of the internal clock being adapted in terms of its frequency and phase angle in such a way that it corresponds to the carrier frequency of the clock signal. The feature of the microscope module using a clock derived from the clock signal as internal clock can be understood to the effect of the internal clock being adapted to a certain frequency ratio and, in particular, a certain phase angle relative to the clock signal, for example to a quarter of this frequency. The microscope modules may have dedicated clock generators, the frequency thereof and, in particular, also the phase thereof are set to the frequency and phase of the clock signal or a clock derived therefrom.

Preferably, the clock signal of the central clock generator is used not only for transmitting a uniform clock for the communication between the modules. Rather, information can also be modulated/encoded into the clock signal. Thus, a clock modulation circuit is preferably present and configured to modulate a clock signal of the central clock generator in order to encode an information item. Consequently, the clock signal of the clock generator is modulated before being transmitted to the various microscope modules. The clock generator and the clock modulation circuit may also be formed by a common electronic circuit. The clock input circuit or another circuit of the microscope module can now be configured to read an information item encoded into the clock signal. This information item can be any data stream, for example a control information item for the microscope modules, for instance a reset command or a global asynchronous reset command, a handshake signal, an alarm or start and end points of a module operation. Advantageously, this allows data to be transferred in the clock signal without the data lines having to be used to this end. Information items for a synchronization can also be encoded and transmitted in the clock signal.

In principle, the clock signal can be modulated by way of an amplitude modulation. While this is easier to implement, it may influence the quality under certain circumstances. In a preferred embodiment, the clock modulation circuit is configured to modulate a clock signal by virtue of the clock modulation circuit modulating a distance between rising clock pulse edges while leaving a distance between falling clock pulse edges constant. Alternatively, the clock modulation circuit modulates a distance between falling clock pulse edges while leaving a distance between rising clock pulse edges constant. Thereupon, the clock frequency can be extracted from the pulse edges with a constant distance, while the variable pulse edge distance encodes an information item. This information transfer does not influence the quality of the clock. In particular, there is no, or hardly any, jitter and noise of the clock signal remains uninfluenced.

While the central clock for communication between the microscope modules is uniform, a different clock frequency can be used within a microscope module. In particular, the internal clock frequency of one microscope module can be different from the internal clock frequency of another microscope module. To this end, at least one of the microscope modules can be configured to form a clock with a different frequency from the received clock signal and use this clock as a local module clock, i.e., as an internal clock frequency. Thus, the received clock signal can be divided into a lower frequency which is then used as local module clock. By way of example, this is often expedient in order to operate cost-effective components, e.g., FPGAs, at a lower frequency. Depending on the type of the employed FPGA, the modules can operate with clock frequencies that have been lowered to different extents. By contrast, a higher local module clock, which may also be higher than the central clock, can be generated for microscope modules with high-performance components. Expressed differently, different microscopy modules can be configured to form different clocks from the clock signal received in each case and use said clocks as local module clock in each case. Herein lies a decisive difference in relation to conventional microscope systems.

It is particularly preferable for the clock modulation circuit to be configured to encode a clock-pulse number information item into the clock signal. The clock-pulse number information item marks a clock pulse from which the subsequent clock pulses can be counted. By way of example, the clock-pulse number information item can label a 1st clock pulse. The modules count all clock pulses following the latter. As a result, a module can start a process planned for the future in good time. By way of example, if a module should transmit a control command at the 20th clock pulse and the module requires 12 clock pulses to calculate the control command, the module starts the calculation procedure at the 8th clock pulse. Decisive time advantages are obtained as a result thereof. Herein lies a substantial difference to synchronization according to the prior art: In the latter, a module cannot predict when it will receive a synchronization signal and therefore cannot ascertain in advance when it should start the calculation procedure. Following a synchronization signal, the modules in the prior art continue to work independently of one another, i.e., asynchronously; as a result, a synchronization signal does not provide a meaningful option for starting a calculation procedure after e.g. 8 clock pulses and then emitting a control command that another module would receive at a defined clock time.

A plurality of microscope modules may be connected in series, in particular for simple wiring. For a simpler understanding, an example is described below, in which at least a first and a second microscope module of the plurality of microscope modules are connected in series. The central clock generator transmits the clock signal to the first microscope module. The latter passes the clock signal to the second microscope module. As a result, the first and the second microscope module do not receive the clock signal at the same time but receive these in succession with a time offset. Such a time offset is problematic for the embodiment described above, in which a clock-pulse number information item is transferred, by means of which all modules should be able to identify a certain time (i.e., the same clock pulse number). By way of example, a time offset between the first and second module can be approximately three clock pulses. Now, when the second module receives the clock-pulse number information item specifying the 1st clock pulse, the first module has already continued counting by three clock pulses. In order to take account of such a time offset, the first and/or second microscope module can include a data memory in which a predetermined time offset value is stored, the latter serving as a measure for the time offset. The time offset value may have been calculated or measured in advance and it is securely stored in one of the modules. In order to take account of the time offset, the first and/or second microscope module can now be configured to change a clock-pulse number corresponding to the clock-pulse number information item by the time offset value (or a variable derived therefrom). In the aforementioned example with a time offset value corresponding to three clock pulses, the first module would reduce the clock-pulse number corresponding to the clock-pulse number information item by three. Specifically, if it receives the clock-pulse number information item specifying the 1st clock pulse, it would derive therefrom that the −2nd clock pulse is present. Three clock pulses later, the clock-pulse number in both modules is one. Consequently, the first and second module count the same clock-pulse number at all times. If a module should carry out a certain process at a certain clock-pulse number, the clock-pulse number advantageously corresponds in all affected modules. By way of example, if a module should transmit a control command to another module at the 50th clock-pulse number, the 50th clock-pulse number corresponds to the same time in both modules.

The clock modulation circuit can be configured to encode a reset command into the clock signal. The clock input circuits or other circuits of the microscope modules are configured to identify such a reset command encoded into the clock signal and thereupon reset a clock count or a state machine (finite state machine) of this module. The clock pulse at which the reset command is received can consequently be reset to a certain clock-pulse number, for instance a 0th or 1st clock pulse. Advantageously, a common clock count can be consequently ensured for the various microscope modules. In a state machine, the microscope module can be in one of several states, with the reset command setting a certain state or original state, in particular independently of the current or past states. Irrespective thereof, other commands with further functions may also be encoded into the clock signal.

In principle, the microscope modules can be any component of a microscope with electronic component parts or any electronic component that interacts with a microscope. By way of example, at least some of the microscope modules can be chosen from the following group of microscope modules: a laser scanning module, a spectrometer module, a multiphoton examination module, a filter control module which, e.g., introduces a light filter into a beam path or removes said light filter from the latter, a frame recording module which may includes, e.g., one or more cameras or light detectors, a light source module for emitting light or a visualization module which in particular may have a monitor.

The central clock generator can also be configured to synchronize its own clock signal with an external clock. This can be useful so that the microscope system of the invention can work in synchronous fashion with other electronic devices that are not supplied by way of the same clock signal. To this end, the central clock generator has an input for receiving an external clock. Moreover, the central clock generator has a control loop, more particularly a phase-locked loop (PLL), which adapts the clock signal to the external clock, i.e., changes the clock signal in terms of frequency and/or phase. The clock signal is only subsequently transmitted to the microscope modules. Here, the clock signal need not be set to the same frequency as the external clock but may also be an integer multiple of the external clock. Many measuring devices use a 10 MHz clock. So that the central clock generator can operate synchronously with such an external clock, it can preferably be configured to produce a clock signal with a frequency that is 10 MHz or an integer multiple thereof. The control loop now adapts the phase of the clock signal to that of the 10 MHz external clock and the frequency of the clock signal is slightly modified such that the latter corresponds to the external clock or an integer multiple of the external clock.

The central clock generator producing a clock signal with 10 MHz or with an integer multiple thereof, which is subsequently divided down to 10 MHz, may be advantageous, even in embodiments without synchronization with respect to an external clock.

It may be advantageous if the microscope system can also synchronously work together with any other device that includes a clock input connector. To this end, the central clock generator can have at least one output for connecting a device and can be configured to output at the output the clock signal or a clock derived therefrom. By way of example, the output can be an interface for connecting a cable. Thus, any microscope module or other device can be variably connected and can profit from synchronous data transfer. Since numerous devices operate with a 10 MHz clock, the central clock generator can be configured to output a 10 MHz clock at the output. Provided the clock signal has a higher frequency (in particular an integer multiple of 10 MHz), the central clock generator has a circuit with which a clock with 10 MHz is formed from the clock signal and output at the output.

The properties of the invention described as additional apparatus features are also to be interpreted to be variants of the method according to the invention, and vice versa. In particular, the method variants arise by the use as intended of the described properties of the microscope system.

In principle, any electronic circuit that produces an oscillation at a certain, generally constant frequency can be considered to be a clock generator. The modulation circuit and the clock generator can be formed by a common electronic circuit or else be formed in a manner spatially separated from one another.

BRIEF DESCRIPTION OF THE DRAWINGS

Further advantages and features of the invention will be described below with reference to the appended schematic figures. In the figures.

Identical and identical-acting constituent parts are generally identified by the same reference signs in the figures.

DETAILED DESCRIPTION OF EMBODIMENTS OF THE INVENTION

Figure 2:
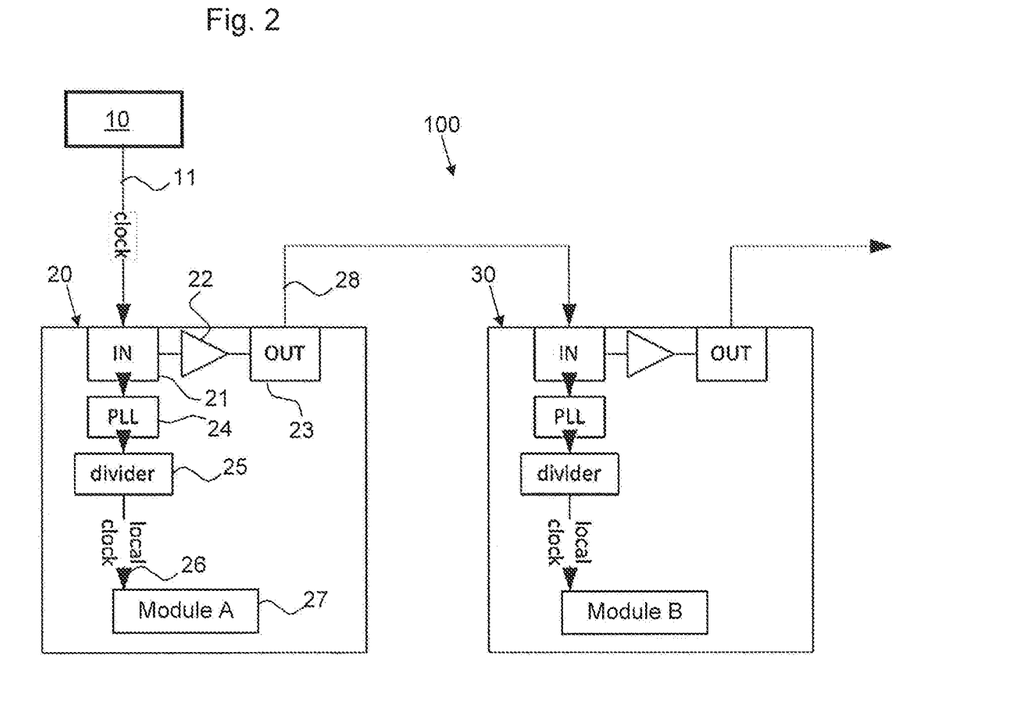
FIG. 2 is a schematic illustration of a microscope system according to the invention.

FIG. 2 illustrates an exemplary embodiment of a microscope system 100 according to the invention. As essential components, the latter has a plurality of microscope modules 20, 30 and a central clock generator 10.

In principle, the microscope modules 20, 30 can be any constituent parts of a light microscope that have electronic components. By way of example, the module 20 can be a laser scanning unit and the module 30 can be a light source unit which has a plurality of lasers and the actuation unit thereof, for example.

The modules 20, 30 communicate with one another and/or with a central computing unit (not illustrated). Data communication times must be synchronized with one another. By way of example, scanning mirrors of one module and a light source of another module should be actuated in a manner synchronized in time with one another.

In the prior art, these modules operate at asynchronous clock frequencies that are independent of one another. Therefore, it is difficult to synchronize in time future processes with respect to one another. Synchronization signals that are transmitted to the modules are frequently used. By way of example, a synchronization signal can be a rising pulse edge in a signal. Should the modules receive a synchronization signal, they can identify the time of reception as a commonly known time. Processes can now be carried out simultaneously. However, future processes cannot be planned precisely because the various modules continue to run independently of one another in asynchronous fashion again following the reception of the synchronization signal.

This is avoided in the modules 20, 30 of the microscope system 100 according to the invention. To this end, a uniform clock generated by the central clock generator 10 is used. The latter outputs a clock signal 11 that is guided to all microscope modules 20, 30.

In the illustrated example, the clock generator 10 transmits the clock signal 11 to the first module 20, which forwards the clock signal to the second module 30.

The module 20 has a clock input circuit 21, by means of which an incoming clock signal 11 is received. By way of an amplifier circuit 22, which may also be considered to be part of the clock input circuit 21, the clock signal 11 is amplified and output via a clock output circuit 23 on a line 28 to the next module 30.

From the clock input circuit 21, the clock signal 11 is moreover provided to a frequency ascertainment circuit 24, for example a phase-locked loop 24, which determines a carrier frequency of the clock signal 11. The frequency ascertainment circuit 24 can also be considered to be part of the clock input circuit 21.

Furthermore, the module 20 has a clock divider circuit 25, which can derive another clock from the carrier frequency of the clock signal 11, for example a clock at half the frequency of the carrier frequency of the clock signal 11. This derived clock is used as an internal clock 26 or module clock 26 for components 27 of the module 20. By way of example, the components 27 may have an FPGA. The clock divider circuit 25 is designed such that its output clock 26 is suitable for the FPGA of this module.

The module 30 has the same form as the module 20 and differs from the latter in terms of the design of the components 27. Depending on the type of components 27, the clock divider circuit of the module 30 can have a different embodiment to the clock divider circuit of the module 20 such that the modules 20, 30 output different internal clocks. However, these internal clocks have a known relationship to one another because both are derived from the same clock signal 11 of the central clock generator 10.

The clock signal 11 is also used for data transfer. To this end, a data stream is modulated into the clock signal 11. This is described in more detail with reference to FIG. 3, which shows the clock signal 11 in the uppermost row. The second row shows a modulated clock signal 12. Here, the times of the falling pulse edges of the clock signal are modulated to transfer information items. A case is illustrated in which the falling pulse edge of the first clock pulse on the left side of the figure is delayed to 90% of the time duration between two rising pulse edges. The time of the falling pulse edge is interpreted as an information item by a module 20, 30. At least, such information items contain a clock-pulse number information item, as a result of which different clock pulses are distinguishable from one another. Moreover, additional information can be transmitted by the times of the falling pulse edges, for instance control commands, for example as a reset command or as a reset of the clock-pulse count to zero, for example.

Figure 3:
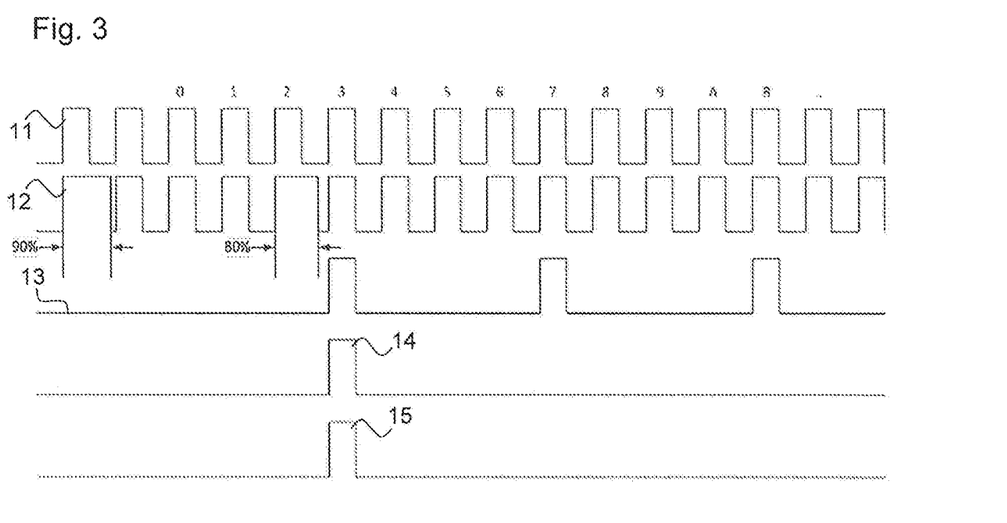
FIG. 3 is a schematic illustration of clock signals between and within the microscope modules of the microscope system of FIG. 2.

By contrast, the rising pulse edges have a constant time spacing in the modulated clock signal 12, and so the carrier frequency or base frequency can be ascertained therefrom.

The signal 13 of the third row of FIG. 3 specifies a clock derived from the clock signal 11 or 12, the frequency of which clock corresponds to ¼ of the frequency of the clock signal 11. By way of example, this can correspond to the duration of the frame recording of a pixel. The signal 14 of the next row has a frequency smaller than that of the clock signal 11 by a factor of 128. Because only the time of a rising pulse edge is evaluated for the illustrated example (and hence the duration of the high or low level is not relevant), the high level of the signal 14 is not, for instance, maintained for a time that is longer by a factor of 128; however, the next time at which a rising pulse edge or no rising pulse edge is present for information encoding purposes only follows after 128 clock pulses (i.e., after 128 rising pulse edges of the clock signal 11). By way of example, the signal 14 can correspond to the duration of a frame recording of a line. By contrast, the signal 15 of the bottom row of FIG. 3 should represent the duration of the frame recording of an entire frame and may equal 65 536 clock pulses, for example. Since, once again, only the question of whether a rising pulse edge is present is relevant and the duration of a high level is not relevant, only a short pulse, once again, is used in the illustrated example.

A future process can be precisely controlled in time by virtue of the time duration of a process being able to be counted in clock pulses (for example 65 536 clock pulses for recording a frame). By way of example, change commands for the light source can always be transmitted to the light source module after 65 536 clock pulses.

The invention therefore allows particularly precise and efficient data communication between different modules in a microscope system.

Figure 4:
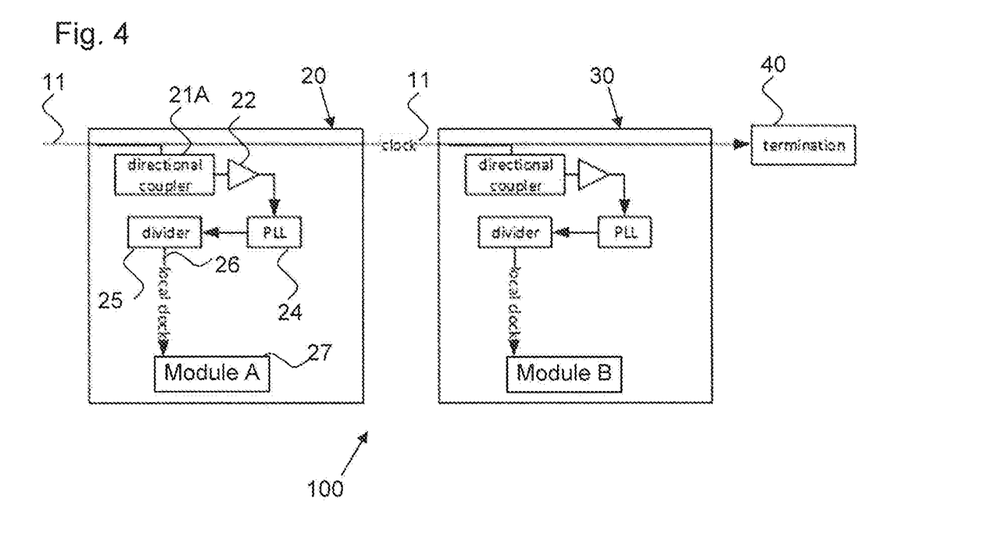
FIG. 4 is a schematic illustration of a further microscope system according to the invention.

An alternative embodiment of a microscope system 100 according to the invention is shown in FIG. 4. The embodiment is similar to the microscope system 100 illustrated in FIG. 2, wherein components with the same function have corresponding reference signs and the explanation provided in relation to FIG. 2 in this respect also applies to the exemplary embodiment of FIG. 4. As a substantial difference in relation to FIG. 2, a clock signal 11 in FIG. 4 is not guided through a microscope module 20 in order to be forwarded to a next microscope module 30. Rather, a line for the clock signal 11 is provided, decoupling to the various microscope modules 20, 30 being implemented from said line in each case. Decoupling from the line into a microscope module 20 can be implemented by a directional coupler 21A of the respective microscope module 20. The directional coupler 21A guides a signal component of the clock signal 11 into the respective microscope module 20 while the noncoupled remaining signal component of the clock signal 11 runs on to the next microscope module 30 without passing through the microscope module 20. As a result of this, time delays as a result of guiding the clock signal 11 are reduced. A signal amplification of the component of the clock signal coupled into the module 20 is implemented here by the amplifier circuit 22 only for the clock signal internally used in the microscope module 20 and not for the component of the clock signal 11 guided to the next microscope module 30. Accordingly, the module 20 does not require a clock input circuit and clock output circuit but can otherwise be designed as described in relation to FIG. 2; in particular, it may have a frequency ascertainment circuit and the remaining components described there.

The line for the clock signal 11 is terminated by a line termination 40 in this embodiment.

In place of a directional coupler 21A, use can also be made of a multi-drop bus or multi-drop topology for guiding the clock signal 11: The clock signal 11 is emitted by the central clock generator 10 and transmitted to a plurality of/all microscope modules 20, 30, 40, 50. Addressing denoting a certain microscope module 20 is encoded into the clock signal 11. Moreover, data linked to the addressing are encoded. The microscope modules 20, 30, 40, 50 receive the clock signal 11 and read the addressing, with only the addressed microscope module 20 processing the encoded data. In this way, a certain microscope module 20, 30, 40, 50 can be actuated in targeted fashion by way of the clock signal 11.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

10 Clock generator
11 Clock signal
12 Modulated clock signal
13 Derived clock
14, 15 Signal
20 Microscope module
21 Clock input circuit
21A Coupling device, directional coupler
22 Amplifier circuit
23 Clock output circuit
24 Frequency ascertainment circuit
25 Clock divider circuit
26 Local module clock
27 Components of the module
30, 40, 50 Microscope modules
100 Microscope system

What is claimed is:

1. A microscope system, comprising a plurality of microscope modules that are connected to one another for data transfer purposes;
   a central clock generator that generates a clock signal; and
   a clock modulation circuit configured to modulate the clock signal in order to encode an information item by
      modulating a distance between rising clock pulse edges while leaving a distance between falling clock pulse edges constant or
      modulating a distance between falling clock pulse edges while leaving a distance between rising clock pulse edges constant;
      said clock signal with the encoded information item being provided to all microscope modules;
      the microscope modules being configured to
         read the information item encoded in the clock signal;
         use the clock signal or a clock derived therefrom as an internal clock;
         calculate data on the basis of the internal clock; and
         transfer calculated data to another one of the microscope modules on the basis of the clock signal.

2. The microscope system as claimed in claim 1, wherein
   at least some of the microscope modules comprise a clock input circuit and a clock output circuit for forwarding the clock signal, wherein the clock input circuit is configured to receive the clock signal and the clock output circuit is configured to output the clock signal to another one of the microscope modules; or
   at least some of the microscope modules each comprise a coupling device, configured to couple a signal component of the clock signal into the respective microscope module,
   wherein a remaining signal component of the clock signal is not guided through the microscope module but to the remaining microscope modules.

3. The microscope system as claimed in claim 2, wherein
   the clock input circuit or another circuit of one of the microscope modules is configured to at least one of:
      prepare the received clock signal and only then output the latter via the clock output circuit and
      extract a carrier frequency of the clock signal.

4. The microscope system as claimed in claim 1, wherein the clock modulation circuit is configured to encode a clock-pulse number in- formation item into the clock signal.

5. The microscope system as claimed in claim 4, wherein
   at least a first and a second microscope module of the plurality of microscope modules are connected in series such that the central clock generator transmits the clock signal to the first microscope module and the latter passes the clock signal to the second microscope module, as a result of which the first and second microscope modules receive the clock signal with a time offset;
   the first and second microscope module comprises a data memory in which a predetermined time offset value is stored, the latter serving as a measure for the time offset;
   at least one of the first and second microscope modules is configured to change a clock-pulse number corresponding to the clock-pulse information item by the time offset value in order to take account of the time offset.

6. The microscope system as claimed in claim 1, wherein the clock modulation circuit is configured to encode a reset command into the clock signal; and the clock input circuits or other circuits of the microscope modules are configured to identify a reset command encoded into the clock signal and thereupon reset a clock- pulse count or a state machine.

7. The microscope system as claimed in claim 1, wherein at least one of the microscope modules is configured to form a clock with a different frequency from the received clock signal and use this clock as a local module clock.

8. The microscope system as claimed in claim 7, wherein various microscope modules are configured to form different clocks from the clock signal received in each case and use these as the respective local module clock.

9. The microscope system as claimed in claim 1, wherein the microscope modules comprise at least a scanner module and an image recording module, the scanner module comprises at least one scanning mirror and is configured to transfer position data about the scanning mirror to the image recording module throughout a measurement operation, the transfer being implemented on the basis of the clock signal, the image recording module is configured to variably adapt image data processing during the measurement operation as a function of the received position data.

10. The microscope system as claimed in claim 1, wherein the microscope modules comprise at least an image recording module and a light source module, which are configured to carry out a light source calibration process in which:

an illumination intensity of the light source module is varied;

the image recording module measures an image brightness and transfers the lat- ter to the light source module, the transfer being implemented on the basis of the clock signal;

the light source module adjusts the output illumination intensity in a closed-loop control, in dependence of the received image brightness, until a target value is reached;

settings of the light source module obtained by the closed-loop control during the calibration process are used for subsequent measurements.

11. The microscope system as claimed in claim 1, wherein the central clock generator comprises an input for receiving an external clock;

the central clock generator comprises a control loop which is used to adapt the clock signal to the external clock before it is transmitted to the microscope modules.

12. The microscope system as claimed in claim 1, wherein the central clock generator has an output for connecting a device and is configured to output the clock signal or a clock derived therefrom at the output, wherein the central clock generator is configured to produce a clock signal with a frequency that is an integer multiple of 10 MHz, and comprises a circuit with which a 10 MHz clock is formed from the clock signal and output at the output.

13. A method for operating a microscope system, having a plurality of microscope modules which transfer data among one another, said method comprising providing a clock signal from a central clock generator;

modulating the clock signal in order to encode an information item by modulating a distance between rising clock pulse edges while leaving a distance between falling clock pulse edges constant or modulating a distance between falling clock pulse edges while leaving a distance between rising clock pulse edges constant;

transmitting the clock signal with the encoded information item to all microscope modules;

the microscope modules read the information item encoded in the clock signal;

use the clock signal or a clock derived therefrom as an internal clock, calculate data on the basis of the internal clock, and transfer calculated data to another one of the microscope modules on the basis of the clock signal.

14. The method as claimed in claim 13, wherein the information item encoded in the clock signal is a control command for the microscope modules, and wherein the microscope modules execute the control command encoded in the clock signal.

* * * * *